United States Patent [19]

Symonds et al.

[11] 4,455,555

[45] Jun. 19, 1984

[54] CONTROL TRANSDUCER

[75] Inventors: Dean H. Symonds; David E. Brandon, both of Waterloo, Iowa

[73] Assignee: Deere & Company, Moline, Ill.

[21] Appl. No.: 194,574

[22] Filed: Oct. 6, 1980

[51] Int. Cl.³ .................. G08C 19/06; G08C 19/12
[52] U.S. Cl. .................. 340/870.31; 340/870.32; 340/870.33; 340/870.35; 340/870.36; 73/520; 324/176; 336/121; 336/132
[58] Field of Search ............ 340/870.31, 870.32, 340/870.33, 870.34–870.36; 324/207, 208, 166, 167, 176; 336/115, 40, 45, 117, 120, 130, , 119, 135, 121, 123, 122; 73/488, 494, 506, 507, 510, 513, 518–520; 310/168, 268

[56] References Cited

U.S. PATENT DOCUMENTS

| 1,984,939 | 2/1983 | Nachumsohn | 336/132 |
| 2,430,757 | 11/1947 | Conrad et al. | 324/208 |
| 3,137,812 | 6/1964 | Andresen | 324/208 |
| 3,250,982 | 5/1966 | Bowie | 324/208 |
| 3,624,625 | 11/1971 | Stonestreet | 340/870.31 |
| 3,641,429 | 2/1972 | Cox, Jr. et al. | 340/870.33 |
| 3,646,537 | 2/1972 | Erspamer et al. | 340/870.33 |
| 3,758,845 | 9/1973 | MacKelvie et al. | 340/870.31 |
| 3,818,326 | 6/1974 | Masuda et al. | 324/208 |
| 3,855,525 | 12/1974 | Bernin | 324/208 |
| 3,961,243 | 6/1976 | Schulz | 324/208 |
| 4,013,911 | 3/1977 | Fujiwara et al. | 340/870.35 |
| 4,086,533 | 4/1978 | Ricouard et al. | 324/208 |
| 4,156,192 | 5/1979 | Schedrovitsky et al. | 324/208 |
| 4,164,706 | 8/1979 | Akita et al. | 324/208 |

FOREIGN PATENT DOCUMENTS 827319 11/1969 Canada .
960764 1/1975 Canada .

Primary Examiner—Donnie L. Crosland

[57] ABSTRACT

An inductive displacement transducer includes a primary and at least two secondary coils with a movable coupling member for varying the amount of mutual coupling therebetween as a function of the displacement of a movable member. The secondary coils are wrapped around magnetic cores which are embedded in a disc-shaped core structure. The coupling member comprises a pair of magnetic conductive arms disposed on either side of the core structure and attached to a shaft rotatably received by a central axial bore in the core structure. An end of the shaft may be attached to the movable member. A control circuit excites the primary coil with an excitation signal with abrupt repetitive transients so that voltage spikes appear in the secondary coils with an amplitude related to the amount of mutual coupling. The voltage spikes are integrated into a D. C. voltage with an amplitude of the voltage spikes and thus, indicative of the displacement of the movable member.

8 Claims, 7 Drawing Figures

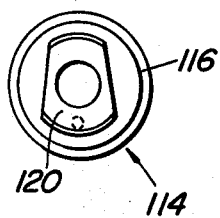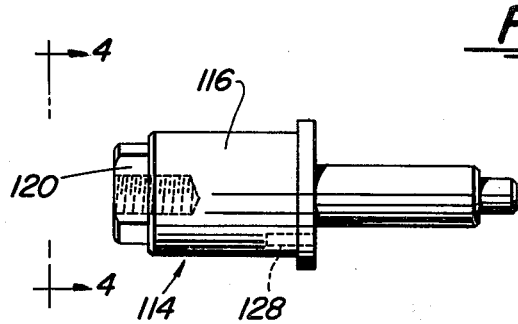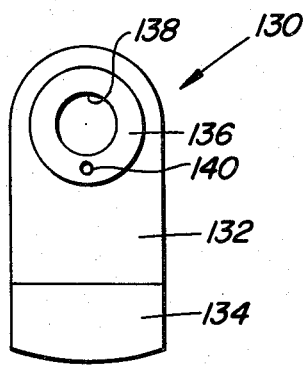

CONTROL TRANSDUCER

BACKGROUND OF THE INVENTION

This invention relates to a transducer and associated circuitry for producing electrical signals indicative of the position of a control lever. More particularly, this invention relates to a rotary inductive transducer and circuit for generating electrical signals indicative of the position of a speed control lever in a hydrostatic drive system.

A typical hydrostatic drive system includes a variable displacement hydraulic pump or motor controlled by an electro-hydraulic pilot valve, such as described in U.S. Pat. No. 4,229,144 and U.S. Reissue application, Ser. No. 226,574 filed Jan. 19, 1981. In such a hydrostatic drive system, the pilot valve may be activated by signals generated by a potentiometer-type transducer coupled to the speed control lever. Potentiometer-type transducers are vulnerable to electrical fault conditions. For example, a short or open circuit condition in the potentiometer could cause an increase in the magnitude of the signal received by the pilot valve. This could cause a dangerous increase in the power output of the pump without any change in the position of the speed control lever.

SUMMARY OF THE INVENTION

An advantage of the present invention is that it provides a transducer and circuit which generate output signals with a magnitude which does not increase as a result of certain electrical failure conditions.

A further advantage of the present invention is that it provides a lever position transducer and circuit with separate outputs which are independent and electrically isolated from each other.

Another advantage of the present invention is that it provides a bi-directional lever position transducer with separate outputs corresponding to different polarities of lever position.

These and other advantages are achieved, according to the present invention, in that there is provided a position transducer of the inductive or electro-magnetic transformer type. The transducer includes a stationary core assembly, including a primary coil and three spaced-apart secondary cores, each with a corresponding coil. A movable two-piece magnetic coupling member, mounted on a rotatable shaft, moves to vary the magnetic coupling between the primary coil and secondary cores as a function of the angular position of the rotatable shaft. The secondary cores and the movable coupling member are arranged so that the primary coil may be coupled to one or the other of the secondary cores, but not to both simultaneously. An electrical circuit applies periodic current pulses to the primary coil so that voltage spikes are generated across the coupled secondary coils with an amplitude related to the amount of coupling between the primary and the coupled secondary coil. These voltage spikes are rectified and filtered to provide a D.C. output voltage with an amplitude proportional to the angular position of the rotatable shaft. A feedback circuit prevents generation of the current pulses when the output voltage amplitude exceeds a predetermined limit.

BRIEF DESCRIPTION OF THE DRAWINGS

FIGS. 3 and 4 are views of the spindle portion of applicants' inductive transducer;

FIG. 5 is a view of one of the coupling rotors of applicants' inductive transducer;

DETAILED DESCRIPTION

Referring to FIGS. 1–5, the rotary control transformer or angular displacement transducer 40 includes a pair of housing portions 42 and 44 which may be bolted together by bolts (not shown). The housing portions define an opening 46 through which extends electrical cable 48. Grommet 50 fits into opening 46 and prevents cable 48 from engaging either of housing portions 42 and 44.

Figure 1:
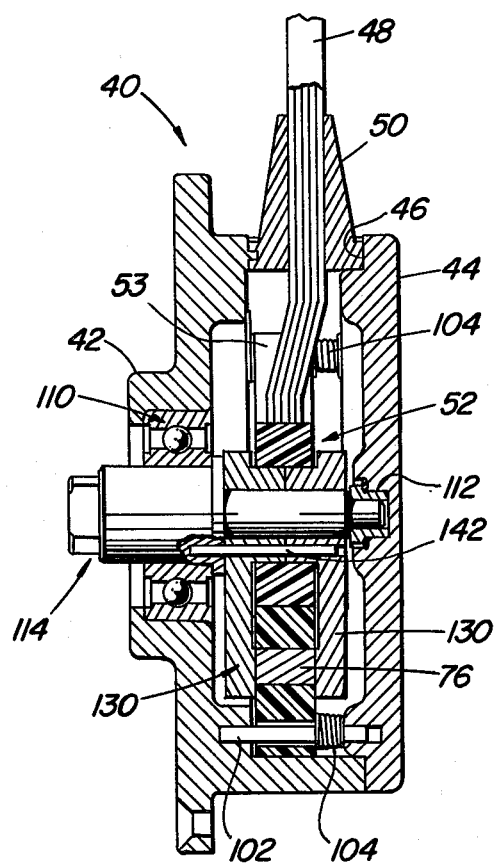
FIG. 1 is a partial sectional view of applicants' inductive transducer.
Figure 2:
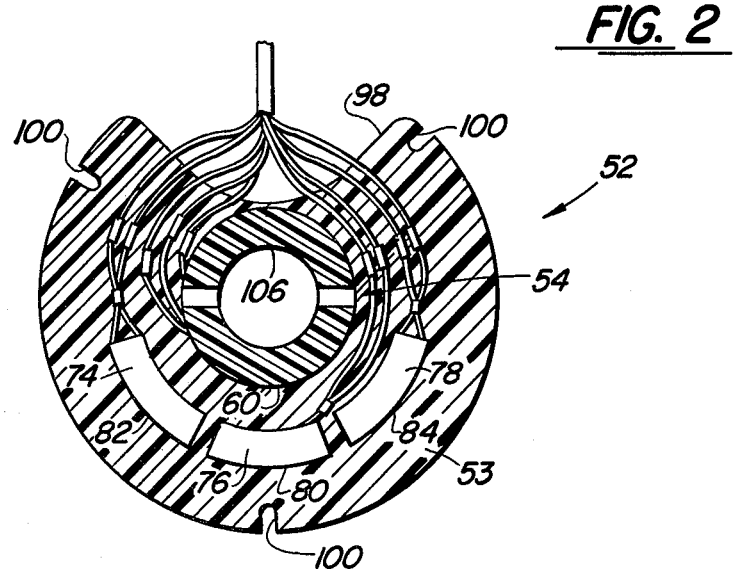
FIG. 2 is a partial sectional view of the core assembly of applicants' inductive transducer.

Housing portions 42 and 44 enclose a fixed transformer core assembly 52. Core assembly 52 includes a disc-shaped epoxy casting 53 in which is embedded a notched bobbin 54 formed out of the material known as "Delrin" and commonly used in transformer construction. The primary coil 60 includes a center tap which is coupled to the positive terminal of a negative ground, 12-volt battery and which divides coil 60 into portions 62 and 64 (see FIG. 6). Conductor 69 connects terminal 66 of coil 62 with a circuit 68, which will be described later. Terminal 70 of coil 64 is grounded via diode D1. Three evenly spaced segment-shaped secondary cores 74, 76 and 78 are spaced radially outwardly from the bobbin 54. Secondary cores 74, 76 and 78 are formed of ferro-magnetic material. A coil 80 surrounds center or return secondary core 76. Coils 82 and 84 are wrapped around the outer secondary cores 74 and 78, respectively. One end of each of coils 82 and 84 is grounded, while their other ends are connected to circuit 68 via conductors 86 and 88, respectively. The cores 74, 76 and 78 and their associated coils are embedded in the disc-shaped epoxy casting 53. Casting 53 includes a concave curvilinear cutout portion 98 which provides a space through which the wires of cable 48 may extend. Casting 53 also includes a plurality of alignment notches 100 in the peripheral edge surface thereof. These notches 100 receive corresponding guide pins 102, one of which is shown in FIG. 1. The guide pins 102 are received in axial bores in the housing portions 42 and 44. Compression springs 104 (two of which are shown in FIG. 1) circumscribe the guide pins 102 and urge the core assembly 52 away from housing portion 44. A central axial bore 106 extends through the core assembly 52 and is surrounded by the primary coil 60.

Housing portions 42 and 44 support bearings 110 and 112, respectively. Bearings 110 and 112, in turn, rotatably support a spindle 114. Spindle 114 includes a large diameter portion 116 with a flat-sided head 120, adapted to be received by a complimentary opening in a linkage (not shown) connected to a control lever (not shown). An axial bore 128 extends part way into portion 116 of spindle 114.

A pair of identical ferro-magnetic rotors 130 are mounted on opposite sides of the core assembly 52 for rotation with the spindle 114 to complete a magnetic flux path between the primary coil 60 and the secondary cores 74, 76 and 78. Rotors 130 may be rigidly and mechanically fixed to the other of the pair of relatively movable objects (not shown) by means of the spindle 114. Each rotor includes a body 132 of generally rectangular cross-section. One end of each rotor includes a slightly raised axial facing planar surface 134 which faces towards the core assembly 52. The rotors 130 may be positioned so that the surfaces 134 are in overlapping relationship with the axial facing end faces of only one of the secondary cores 74, 76 or 78, or, the rotors 130 may be positioned so that the surfaces 134 simultaneously overlap the center secondary core 76 and either, but not both, of the outer secondary cores 74 and 78, because the separation between the outer secondary cores 74 and 78, is greater than the width of the rotors 130. A cylindrical neck 136 extends axially from the other end of the body 132. The projecting necks 136 are rotatably received by the bore 106 of core assembly 52, and thus, may be considered as halves of a rotatable primary core surrounded by the primary coil 60. An axially-mounting bore 138 extends through the neck 136 and body 132 and a portion of spindle 114. Alignment bores 140 extend axially through each rotor 130. A pin 142 is received by both alignment bores 140 and by bore 128 of spindle 114. The pin 142 maintains the rotors 130 in alignment with each other and forces them to rotate with spindle 114. By having two rotors 130 movable on both sides of the cores, flux leakage between the primary coil 60 and the uncoupled secondary core is reduced from that which would occur if the cores were permanently coupled on one side with only one movable rotor on the other side.

Figure 6:
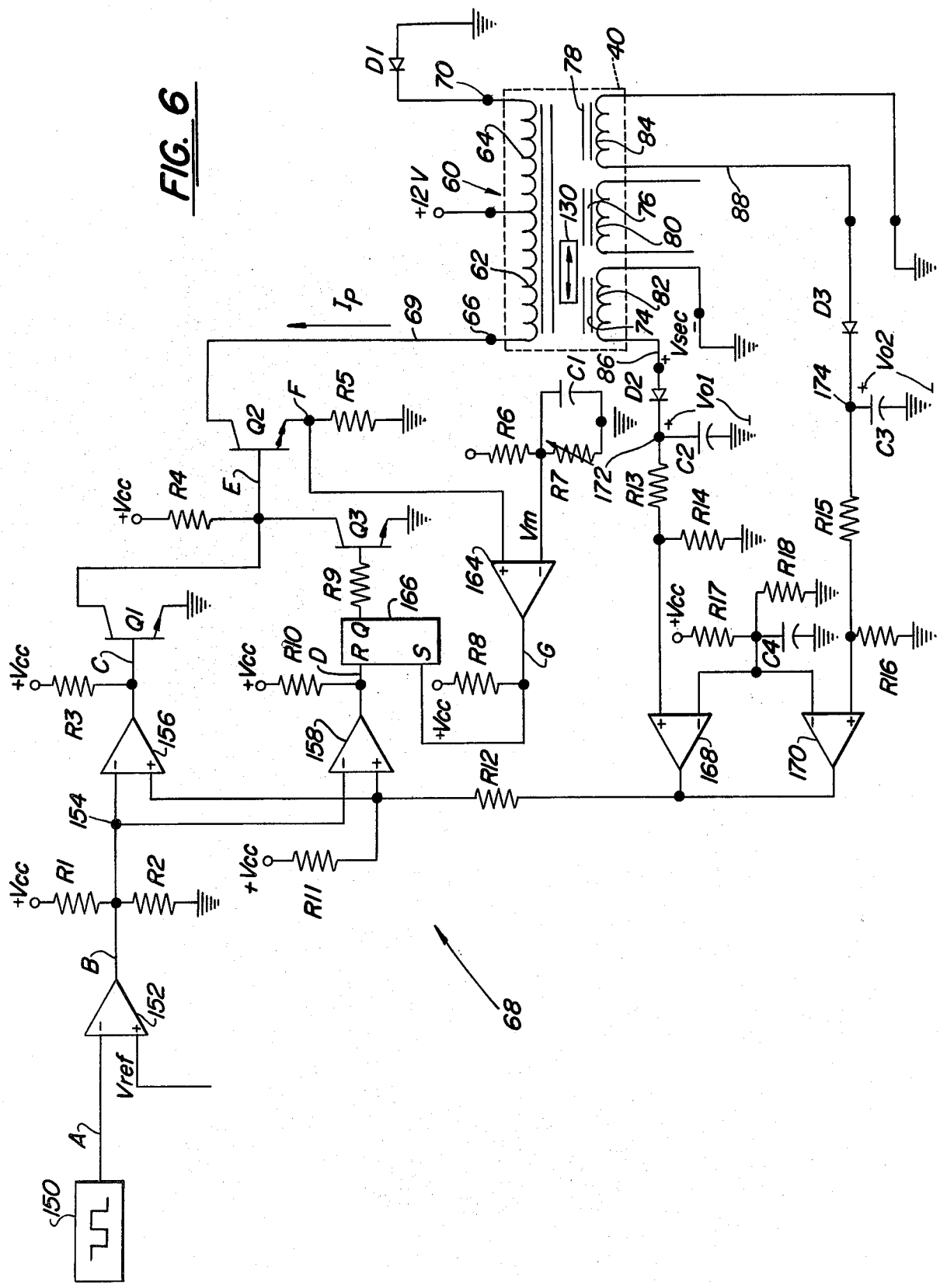
FIG. 6 is a schematic diagram of the circuit portions of applicants' invention.

Viewing FIG. 6, the control circuit 68 includes repetitive signal generator 150, such as a 10% duty cycle, 5-volt positive square wave generator. The output of generator 150 is coupled to the inverting input (−) of op amp 152. A constant reference voltage source (Vref) is connected to the non-inverting input (+) of op amp 152. The output of op amp 152 is connected to D.C. supply voltage (Vcc) via resistor R1 and to ground via resistor R2. Resistors R1 and R2 constitute a voltage divider which limits the voltage at terminal 154 to $Vcc \times (R2 \div (R1+R2))$. Terminal 154 is coupled to the inverting inputs (−) of op amps 156 and 158. The output of op amp 156 is coupled to the base of grounded emitter transistor Q1 and to Vcc via resistor R3. The collector of Q1 is connected to Vcc via resistor R4, to the base of driver transistor Q2 and to the collector of a grounded emitter transistor Q3. The collector of transistor Q2 is connected to a terminal 66 of primary coil 62. The emitter of Q2 is coupled to ground via resistor R5 and to the non-inverting (+) terminal of op amp 164.

Another voltage divider consists of a fixed resistance R6 coupled between Vcc and a grounded variable resistor or potentiometer R7 which is connected in parallel with a filter capacitor C1. This voltage divider provides a variable reference voltage (Vm) which is coupled to the inverting (−) input of op amp 164. The output of op amp 164 is coupled to Vcc via resistor R8 and to the set (S) input of set-reset flip-flop 166. The Q output of flip-flop 166 is coupled to the base of transistor Q3 via resistor R9. The reset input (R) of flip-flop 166 is coupled to Vcc via resistor R10 and to the output of op amp 158. The non-inverting (+) inputs of op amp 156 and 158 are coupled to Vcc via resistor R11 and to the outputs of op amp 168 and 170 via resistor R12.

Secondary coil 82 is coupled between ground and the anode of diode D2. The cathode of diode D2 is connected to output terminal 172, to ground via capacitor C2 and to the non-inverting (+) input of op amp 168 via resistor R13. The (+) input of op amp 168 is coupled to ground via resistor R14. Secondary coil 84 is coupled between ground and the anode of diode D3. The cathode of diode D3 is connected to output terminal 174, to ground via capacitor C3 and to the non-inverting (+) input of op amp 170 via resistor R15. The (+) input of op amp 170 is coupled to ground via resistor R16. The inverting (−) inputs of both op amps 168 and 170 are coupled together, to Vcc via resistor R17 and to ground via parallel connected resistor R18 and capacitor C4.

MODE OF OPERATION

Assume that the spindle 114 is moved to position the coupling rotors 130 of transducer 40 so that there is a relatively large amount of magnetic coupling between primary coil 60 and secondary core 74 and consequently, very little magnetic coupling between the primary coil 60 and the other secondary core 78. This condition is illustrated schematically in FIG. 6. Now, assume that power is applied to the circuit of FIG. 6.

Figure 7:
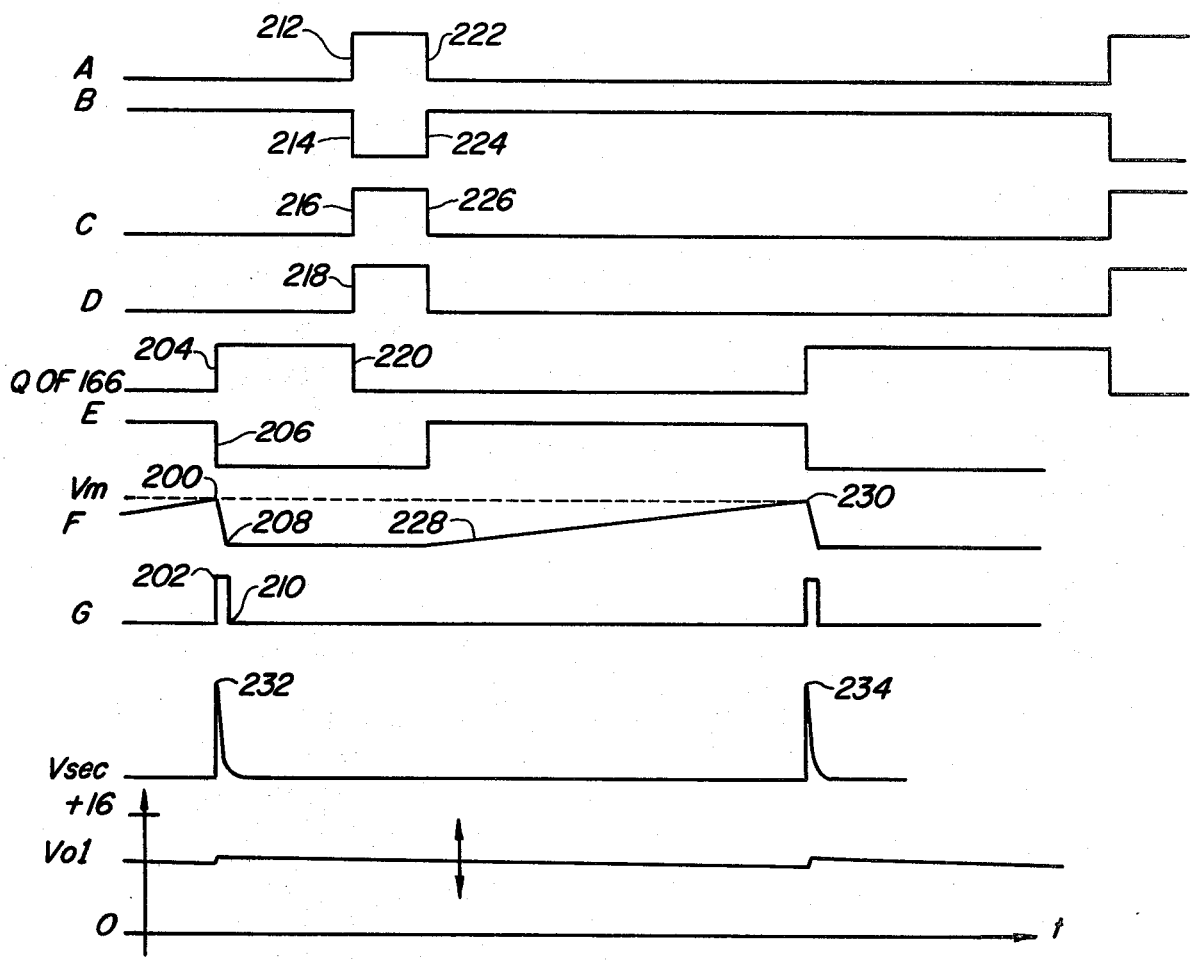
FIG. 7 is a waveform diagram of signals generated at various points in the circuit of FIG. 6.

If transistors Q1 and Q3 are initially off, then driver transistor Q2 will be conducting because its base is connected to Vcc via resistor R4. Thus, a steadily increasing current Ip will flow from +12 volts to ground via primary coil 62, conducting transistor Q2 and resistor R5. Eventually, the current Ip attains a value such that the voltage F across resistor R5 equals Vm, ($Vm = Vcc \times (R7 \div (R6+R7))$), as at 200 of FIG. 7. When this happens, the output of op amp 164 goes high, as at 202, setting the Q output of flip-flop 166 high, as at 204, and turning on transistor Q3. The turning on of Q3 lowers the voltage E, as at 206, at the base of transistor Q2, thus turning Q2 off, terminating the current Ip and returning voltage F and the output of op amp 164 to zero, as at 208 and 210, respectively.

The circuit of FIG. 6 remains in this condition until the leading edge 212 of the next pulse from the generator 150 occurs. This causes the output B of op amp 152 to toggle high-to-low, as at 214. This high-to-low transition of signal B causes the output signal C of op amp 156 to toggle low-to-high, as at 216, thus turning on transistor Q1. The high-to-low transition of signal B also causes the output signal D of op amp 158 to toggle low-to-high, as at 218, and turning transistor Q3 off. Transistor Q2 remains off unless both transistors Q1 and Q3 are off simultaneously.

The high-to-low transistion of the pulse of signal A, which occurs at 222, causes a low-to-high transistion of signal B, as at 224. This low-to-high transition of signal B toggles the output signal C of op amp 156 high-to-low, as at 226, thus turning transistor Q1 off. With both transistors Q1 and Q3 off, transistor Q2 turns on and the increasing current Ip begins to flow again, as at 228. As described previously, the current Ip increases until it reaches a value such that $Ip \times R5 = Vm$, as at 230, at which point Q2 is turned off and the current Ip is again abruptly terminated, as previously described. This process repeats itself periodically at a 24 kHz rate, due to the 24 kHz repetition rate of the output A of generator 150.

Due to the well-known L(di/dt) effect, the abrupt terminations or transients of the current Ip through the inductance of the primary coil 60 produce high amplitude voltage spikes, as at 232 and 234, in the voltage Vsec which appears across secondary coil 82. These periodic voltage spikes produce a filtered and substantially D.C. output voltage Vo1 across capacitor C2. By moving the coupling rotors 130 to increase or decrease the overlap between the rotors 130 and the secondary cores, and thus, increase or decrease coupling between the primary coil 60 and the secondary coil 82, the voltage Vo1 may be increased or decreased, respectively, between zero and approximately +16 volts D.C. For example, when the coupling rotors 130 are moved to the right, viewing FIG. 6, the amount of flux coupled to the secondary coil 82 is decreased while the amount of flux coupled to center secondary coil 80 increases. Voltage Vo2 may be similarly varied by moving the coupling rotors 130 to couple secondary coil 84 with primary coil 60. The linearity of the relationship between the amount of flux coupled to the secondary coil 82 and the position of the coupling rotors 130 may be controlled by connecting an impedance across the center or return secondary coil 80. However, it has been determined that a desirable linear flux coupling characteristic may be achieved by open circuiting center secondary coil 80, as shown in FIG. 6.

The circuit 68 includes protection against over-voltage conditions of the output voltages Vo1 and Vo2. For example, the voltage Vo1 is sensed by the non-inverting (+) input of op amp 168 via a voltage divider consisting of R13 and R14. A voltage of +2.5 volts is applied to the (−) input of op amp 168. Thus, the output of op amp 168 remains low unless voltage Vo1 increases to a value such that $Vo1 \times (R14 \div (R13+R14)) = 2.5$ volts, at which point the output of op amp 168 goes from low-to-high. This high level output of op amp 168 is applied to the non-inverting (+) input of op amp 158 which prevents flip-flop 166 from being reset, thus assuring that transistor Q3 cannot be turned off after it is turned on by the setting of flip-flop 166. The high level output of op amp 168 is also applied to the non-inverting input of op amp 156, thus forcing the output of op amp 156 high and turning on transistor Q1. The turning on of either transistor Q1 or Q3 turns off transistor Q2 and prevents generation of further pulses of current Ip, thus preventing further spikes in voltage Vo1. This allows capacitor C2 to discharge and decrease voltage Vo1, eliminating the over-voltage condition.

Thus, the circuit 68 and the transducer 40 cooperate to provide electrically isolated output voltages Vo1 and Vo2, each with a magnitude corresponding to the angular position of spindle 114 relative to the fixed core assembly 52. These output voltages may be applied via high input impedance voltage-to-current amplifiers (not shown) to drive the solenoid coils of pilot valves of a hydraulic drive system, such as disclosed in U.S. application, Ser. No. 967,368. In this manner, the isolated voltages Vo1 and Vo2 may be used to independently control the forward and reverse speeds, respectively, of a hydraulic drive system.

Safety-related advantages are realized by applicants' inductive transducer and the associated circuitry when used to control a hydraulic drive system in the manner suggested above. For example, a shorted turn in the secondary coil 82 or 84 results in a reduced corresponding secondary coil voltage Vsec since the ratio of the number of turns in the secondary coil to the number of turns in the primary coil is effectively reduced. Open circuits in secondary coils 82 or 84 also cause a reduced secondary coil voltage Vsec since the current flow in the secondary coil would be completely prevented. Similarly, open circuit conditions in the primary coils 62 or 64 reduce the amount of flux in primary core and reduce the secondary voltage Vsec. A short circuit in one of the primary coils will act as a shorted turn which produces a flux which opposes the normally produced flux. This opposing flux reduces the total flux which is coupled to the secondary coils, thus reducing the magnitude of the secondary voltage Vsec and of the output voltage Vo1 or Vo2. If the isolated secondary coils 82 and 84 are connected, as suggested, to independently control the forward and reverse operation of a hydraulic drive system (not shown), then an electrical failure in the transducer 40 would only result in a decreased power output of the hydraulic drive system (due to a reduced swash plate angle) and could not cause the hydraulic drive system to reverse its direction of operation.

Failures in the circuit 68 may also result in a reduced output voltage Vo1 or Vo2. For example, if failures occur such that the driving transistor Q2 remains constantly on or constantly off, then there will be no transients in the primary current Ip, with the result that there will be no voltage spikes in the voltage Vsec across the secondary coils 82 or 84. With no periodic voltage spikes across the secondary coils 82 or 84, then capacitors C2 or C3 will discharge through resistors R13 and R14 and reduce the magnitude of the corresponding output voltage Vo1 or Vo2. As previously discussed, this reduced output voltage would again correspond to a reduced pump power output and a reduced drive speed if this pump were used as the pump in a hydrostatic drive system.

We claim:

1. An inductive displacement transducer for converting displacement between at least two relatively movable objects into electrical signals, the transducer comprising:
   a primary coil connected to and movable with one of the relatively movable objects and connected to an energy source for generating a magnetic flux, the primary coil including an axial bore extending therethrough;
   at least one secondary core fixed relative to the one relatively movable object and spaced apart from the primary coil;
   at least one secondary coil surrounding the secondary core for producing an electrical signal in response to magnetic flux in the secondary core;
   movable magnetic flux conducting means mechanically connected to and movable with the other of the relatively movable objects for coupling magnetic flux between the primary coil and secondary cores, the flux conducting means including a hollow cylindrical portion rotatably received by the axial bore; and
   a shaft with a first portion connected to the other of the relatively movable objects and with a second portion received by the hollow cylindrical portion of the flux conducting means, the flux conducting means being fixed to and rotatable with the shaft to vary the magnetic flux coupling between the primary coil and secondary cores.

2. An inductive displacement transducer system comprising:
   a primary coil;
   a secondary coil;

means for variably magnetically coupling the primary and secondary coils as a function of the displacement to be measured;

excitation means for applying a time varying excitation signal with abrupt transients to the primary coil to produce a secondary signal in the secondary coil with a magnitude representative of the displacement;

comparator means for generating a limit signal when the secondary signal exceeds a predetermined limit; and inhibit means coupled to the excitation means and to the comparator means for preventing generation of the excitation signal in response to the limit signal.

3. The transducer system of claim 2, wherein the excitation means comprises:
a transistor having a conducting state when a known signal is applied to its base, the conducting transistor drawing an increasing current through the primary coil;
means for generating a clock signal;
means for comparing the clock signal with a reference signal and for applying the known signal to the base of the first transistor when the clock signal and the reference signal are in selected states; and
means for comparing the increasing primary coil current to a reference current and for removing the known signal from the base of the first transistor when the primary coil current is greater than the reference current.

4. The transducer system of claim 2, wherein the excitation means comprises:
a transistor having a conducting state when a known signal is applied to its base, the conducting transistor drawing an increasing current through the primary coil;
means for generating a clock signal;
a clock comparator for comparing the clock signal with a reference signal and for generating a signal at an output thereof when a predetermined relationship between the clock and reference signals is satisfied;
a current comparator for comparing the primary coil current with a reference current and for generating current limit signal when the primary coil current is greater than the reference current;
a bistable device having an output with a first state triggered by the current limit signal; and
switch means coupled to the base of the transistor, to the output of the clock comparator and to the output of the bistable device for coupling the known signal to the transistor base only when the outputs of the clock comparator and of the bistable device are in selected states.

5. An inductive displacement transducer for converting displacement of at least two relatively movable objects into electrical signals, the transducer comprising:
a core structure fixed with respect to one of the relatively movable objects, the core structure comprising a primary coil connected to a source of energy for generating a magnetic flux, first and second secondary magnetic cores with a predetermined separation therebetween and first and second secondary coils electrically isolated from each other, each secondary coil being coiled around a corresponding one of the secondary cores, each secondary coil producing an electrical signal in response to magnetic flux in the corresponding secondary core; and a magnetic flux conductive member mechanically fixed with respect to the other of the relatively movable objects for variably coupling magnetic flux between the primary coil and each of the secondary cores, the magnetic conductive member being capable of being positioned in overlapping relationship with the cores, the overlap between the magnetic conductive member and the secondary cores being variable to vary the amount of magnetic flux conducted therebetween, the magnetic conductive member having a width dimension smaller than the separation between the secondary cores so that when there is any overlap between the magnetic conductive member and one of the first and second secondary cores, then there is no overlap between the magnetic conductive member and the other of the first and second secondary cores.

6. An inductive displacement transducer for converting displacement of at least two relatively movable objects into electrical signals, the transducer comprising:
a core structure fixed with respect to one of the relatively movable objects, the core structure comprising a primary coil connected to a source of energy for generating magnetic flux, first and second secondary magnetic cores, first and second secondary coils electrically isolated from each other and each coiled around a corresponding one of the secondary cores, each secondary coil producing an electrical signal in response to magnetic flux in the corresponding secondary core and at least one further secondary magnetic core; and
a magnetic flux conductive member mechanically fixed with respect to the other of the relatively movable objects for coupling magnetic flux between the primary coil and each of the secondary cores and being capable of moving relative to the cores to vary the amount of magnetic flux coupled to the secondary cores, the magnetic conductive member and the cores being arranged so as to substantially prevent coupling between the primary coil and one of the first and second secondary cores when coupling the primary coil with another of the first and second secondary cores, the magnetic conductive member being movable to proportionately couple the magnetic flux between the primary coil and the further core and between the primary coil and the other of the first and second secondary cores.

7. The transducer of claim 6, further comprising:
a shaft connecting the magnetic conductive member to the other movable object, the magnetic conductive member comprising a pair of axially spaced-apart arms extending radially from the shaft and positioned adjacent opposite sides of the core structure.

8. The transducer of claim 7, wherein:
the core structure includes an axially extending bore rotatably receiving the shaft.

* * * * *